United States Patent [19]

Siegfried

[11] Patent Number: 5,302,057
[45] Date of Patent: Apr. 12, 1994

[54] METHOD AND DEVICE FOR CENTERING A GUIDE ROD IN A VALVE GUIDE FOR THE PURPOSE OF THE PRECISION MACHINING OF A VALVE SEAT

[75] Inventor: Ruedi Siegfried, Hinwil, Switzerland

[73] Assignee: Serdi-Societe d'Etudes de Realisation et de Diffusion Industrielles, Annecy, France

[21] Appl. No.: 39,776

[22] Filed: Mar. 26, 1993

Related U.S. Application Data

[63] Continuation-in-part of Ser. No. 764,217, Sep. 23, 1991, abandoned.

[30] Foreign Application Priority Data

Sep. 28, 1990 [CH] Switzerland .......................... 3119/90

[51] Int. Cl.⁵ ........................ B23B 45/14; B23B 35/00
[52] U.S. Cl. .................................. 408/1 R; 408/72 R; 408/80; 408/83.5; 408/115 R
[58] Field of Search ................... 408/1 R, 13, 72 R, 75, 408/79, 80, 83.5, 88, 201, 236, 237, 115 R; 33/520, 632, 644

[56] References Cited

U.S. PATENT DOCUMENTS

| | | | |
|---|---|---|---|
| 3,522,758 | 8/1970 | Minelli et al. | |
| 3,764,204 | 10/1973 | Kammeraad | |
| 4,365,917 | 12/1982 | Harmand | |
| 4,545,706 | 10/1985 | Hiroyasu et al. | 408/83.5 |
| 4,899,458 | 2/1990 | Minelli | |
| 5,017,062 | 5/1991 | Leroux et al. | |

FOREIGN PATENT DOCUMENTS

58-192705 11/1983 Japan .

OTHER PUBLICATIONS

Tool and Manufacturing Engineers Handbook, vol. 1, Machining, Society of Manufacturing Engineers, 1983, Fourth Edition, Chapter 7, pp. 1, 2, and 12-14.

*Primary Examiner*—Daniel W. Howell
*Attorney, Agent, or Firm*—Oliff & Berridge

[57] ABSTRACT

The method centers a guide rod, which is inserted in a valve guide of a valve seat to be machined and which serves as a guide rod for a shaping tool. By hand, or with a mechanical, pneumatic, hydraulic or electro-mechanical device, the guide rod is centered in the valve guide by means of a pivoting ball which is mounted in a manner such that it can pivot in all directions between two clamping plates and which is held with the possibility of translation between the clamping ring and the bottom of a housing. For this purpose, the pivoting ball is displaced circularly such that the guide rod sweeps all around the valve guide. By means of the follower levers, the shape of the valve guide is determined and, by means of a precise mechanical device, the pivoting ball is placed at the center of the swept shape, where it can be fixed by means of plates and of the clamping ring.

10 Claims, 7 Drawing Sheets

METHOD AND DEVICE FOR CENTERING A GUIDE ROD IN A VALVE GUIDE FOR THE PURPOSE OF THE PRECISION MACHINING OF A VALVE SEAT

This is a continuation-in-part of application Ser. No. 07/764,217, filed Sep. 23, 1991 now abandoned.

BACKGROUND OF THE INVENTION

During the machining of valve seats, particularly on heat engines, a maximum precision is sought for the seats. The seats are machined on a lathe, the shaping tool used being guided over a spindle, which is itself guided by a guide rod in the valve guide of the valve seat to be machined. The precision of the valve seat which can be obtained by this machining directly depends on the fine adjustment or on the position of the guide rod in the valve guide. Even if this adjustment is virtually perfect, it is impossible to avoid play between the guide rod and the valve guide, even if this play is small. This is particularly the case when the valve guide is slightly worn and therefore its diameter is enlarged towards its ends. The present invention relates to a method and device allowing the optimum centering of such a guide rod in a valve guide by being placed in the center of the play existing between the guide rod and the valve guide.

Conventional devices for machining valve seats are constituted by a magnetic column and a pivoting arm provided with a spindle which is fixed to this column. The magnetic column has a magnetic base which can be placed directly on the cylinder head or on a fixing plate and can be fixed in position on it. The magnetic column is constituted by a magnetic base with a tubular column onto which the pivoting arm can be locked with the possibility of height adjustment. The pivoting arm carries at its end a support and a clamping device for a pivoting ball, in which is mounted the spindle provided with the guide rod. The spindle can thus be oriented in all directions and locked in any pivoting position by means of the clamping device. The shaping or cutting tool is then mounted on the spindle. The rotation of the spindle can be carried out by hand, but also by means of mechanical, pneumatic, hydraulic or electrical drives. The device is used according to a method in which the guide rod, in the unclamped state of the pivoting ball and of the pivoting arm, is inserted into the valve guide. A guide rod is used which has the closest possible fit and which must have the smallest possible play in the valve guide. After the insertion of the guide rod, the magnetic field is actuated so that the magnetic base is fixed in a rigid manner. After having fixed the pivoting arm in position and having locked the ball, it is then possible to machine the valve seat. The rotary shaping tool is lowered progressively onto the valve seat and material is removed until the seat is cleanly machined. It will be understood that with this method the guide rod inevitably has a certain play in the valve guide and that within this play it has a certain imprecision with regard to its exact central position. If, in addition, the valve guide is a little worn, this play increases. Even if it is a matter of only fractions of degrees of angle, such an imprecision in the position of the guide rod, which must serve as a guide for the turning tool, has a considerable influence on the subsequent fine fitting of the valve in the machined seat. In order to overcome this, certain devices are equipped in particular with a ball pivoting on a spherical air cushion such that, during the insertion of the guide rod, in particular the friction forces between the ball and the clamping device are minimized.

SUMMARY OF THE INVENTION

That is why the object of the present invention is to provide a method which allows the guide rod to be centered in a valve guide with precision. Because of the precise centering, the machined seat must be brought into a position which is centered with respect to the axis of the valve guide. It is also an object of the invention to provide a device for the implementation of the method.

According to the invention, this purpose is achieved by identifying, by nutation of the guide rod, the periphery of the shape of the valve guide, along its edge, in order to determine in at least one centering plane a closed line of nutation inscribed in a rectangle or rhomboid, and then by placing the guide rod in the said centering plane at the center of the said rectangle or rhomboid.

The object of the invention is also achieved by a device for establishing true center for precision machining of a valve seat and guiding a shaping tool, which comprises means of determining the distances between the length sides and width sides of a rectangle or rhomboid which surrounds the nutation pattern of the guide rod, determined by the valve guide, and means by which the guide rod can be placed at the center of the rectangle or rhomboid thus determined.

BRIEF DESCRIPTION OF THE DRAWINGS

The problem presented to the invention is shown in the appended drawings, as is an example of a device for the implementation of the method according to the invention. In the appended drawings:

FIG. 1a is a side cross-section of a guide rod and a valve guide in a conventional system;

FIG. 1b is a view along line I—I of FIG. 1a;

FIG. 2a is a side cross-section of a guide rod in a valve guide according to the invention;

FIGS. 2b-2d are representative views along line II—II of FIG. 2a;

FIGS. 2e and 2f show a nutation oval that determines the minimum dimensions of a rectangle or of a rhomboid;

DETAILED DESCRIPTION OF PREFERRED EMBODIMENT

Figure 1B:
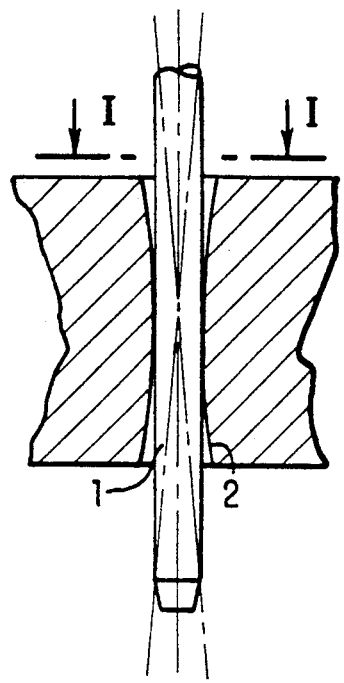
Figure 1B:
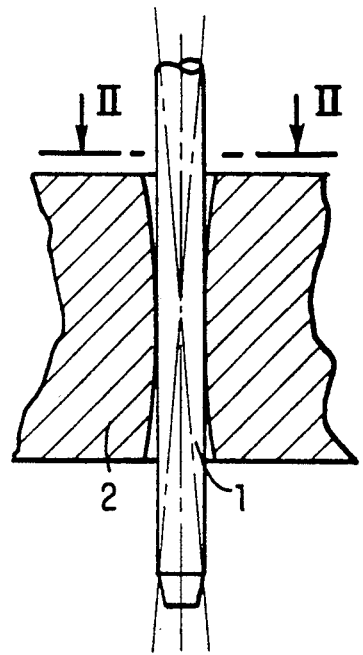
Figure 1B:
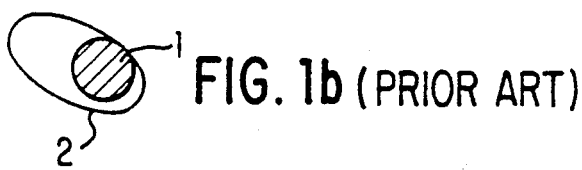

FIG. 1 is a diagrammatic representation of the known centering systems. FIG. 1a shows a cross-section of a valve guide 2. A guide rod 1 is inserted in this guide 2.

It can be seen that this guide 2 is worn. This state is represented beneath in a view in projection in the direction of the arrows I—I. The upper opening of the valve guide 2 can be seen, this opening generally having an oval shape.

FIG. 1b shows passive centering. The guide rod 1 assumes an indeterminate position within its play in the valve guide 2. The centering is more precise if the guide rod 1 is chosen to be better fitting, that is to say if it has little play in the valve guide 2.

Figure 2B:
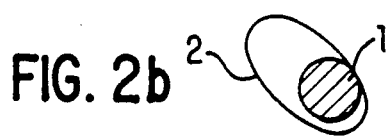
Figure 2C:
Figure 2D:
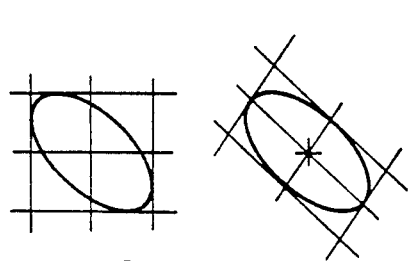
Figure 2D:
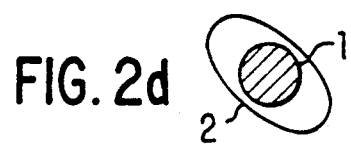

In contrast, FIGS. 2a through 2f show the centering system according to the present invention. FIG. 2b shows the indeterminate position of the guide rod 1 towards the edge of the valve guide 2 after its insertion in the guide. FIG. 2c shows the progression of movements of the guide rod 1 in the valve guide 2 for the purpose of determining the play. As shown by the arrow, the guide rod 1 is therefore displaced all around the edge of the valve guide 2. The nutation oval described thus determines the minimum dimensions of a rectangle or of a rhomboid in which the shape of the valve guide 2 is inscribed as can be seen on the right (FIGS. 2e and 2f). Finally, at FIG. 2d, can be seen the position of the guide rod 1 after its centering, where it has been placed at the center of the rectangle or rhomboid determined.

Figure 3:
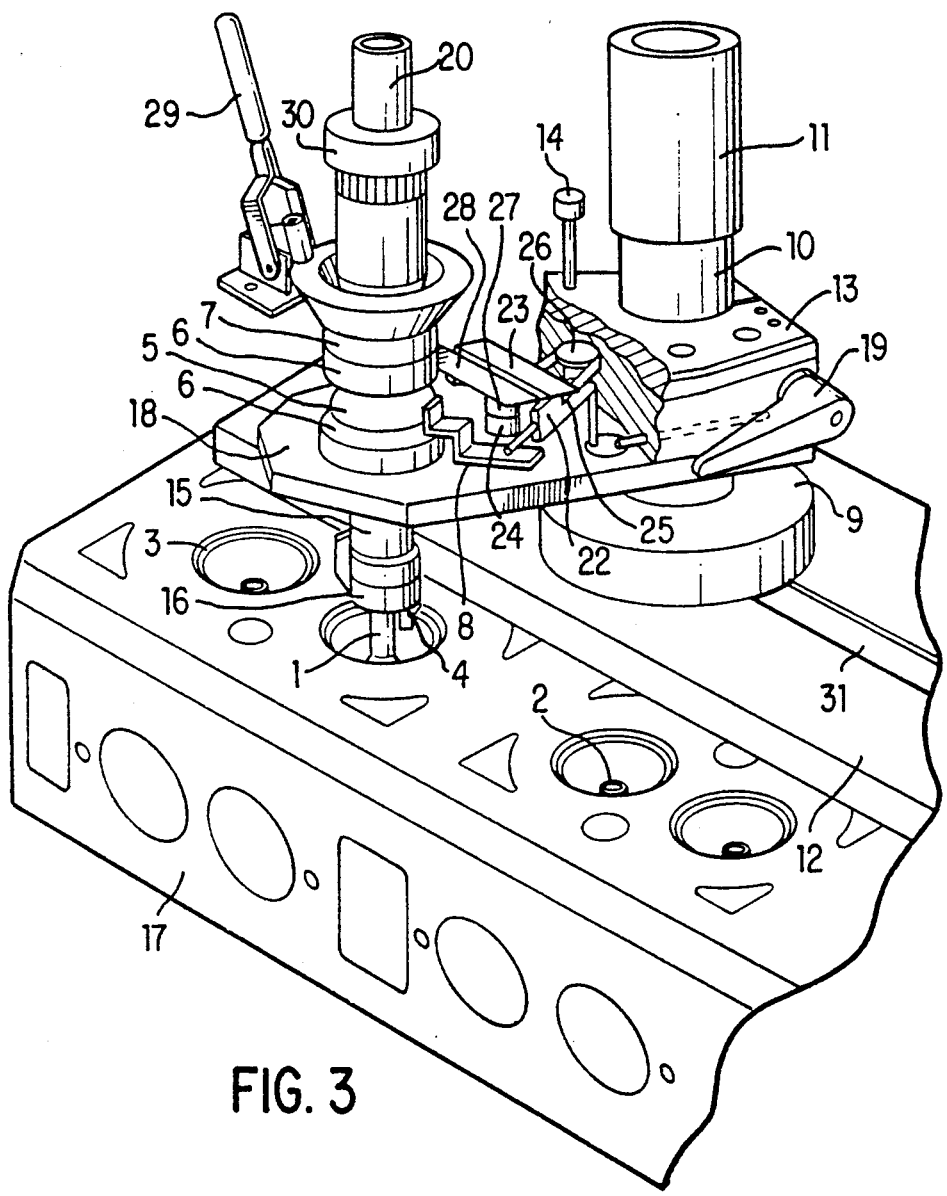
FIG. 3 is partially cutaway view of a device according to the invention in the operating position.

FIG. 3 shows a device for the implementation of the method according to the invention. The upper portion of the housing of a pivoting arm 13 has been cut away for ease of explanation. The column of the device is constituted by a base flange 9 with a support tube 10 and a grip 11. The base flange 9 has a flat bottom and, in the operating position, it is placed on a fixing stud which can be moved in translation in a fixing plate 12 and it is locked in a fixed manner to the plate 12 by means of the grip 11. The pivoting arm 13 is articulated on the support tube 10. By means of a height adjustment screw 14, it can be adjusted for height on the support tube 10 and then clamped in a fixed position by means of the clamping lever 19. Height adjustment screw 14 is threadably received in pivoting arm 13 and extends below the lower surface of the housing of pivoting arm 13 to contact base flange 9. By rotating height adjustment screw 14 when clamping lever 19 is in the release position, the pivoting arm 13 may be accurately adjusted for height along support tube 10.

A spindle 15 is guided through the end of the pivoting arm 13. It has a tool holder 16 for mounting an appropriate shaping tool 4 with which the valve seats 3 are machined. A cylinder head 17, provided with valve seats 3 to be machined, is fixed upside down below the fixing plate 12. For machining, the guide rod 1, which must serve to guide the shaping tool 4, is inserted in the valve guide 2 of the valve seat 3 to be machined. The spindle 15 is mounted in a rotary manner in a pivoting ball 5, the pivoting ball 5 being mounted between two clamping plates 6, and these clamping plates 6 being themselves mounted in free translation between the bottom 18 of the housing of the pivoting arm 13 and a clamping ring 7 seated in a top plate (cut away) of the housing of the pivoting arm 13. It will be understood that the spindle 15 is guided through a bore in the bottom 18. The pivoting ball 5 is displaced relative to the upper surface of the bottom 18 in a motion to substantially circumscribe a circle or an ellipse by hand, mechanically, pneumatically, hydraulically or electromechanically using adaptor 20, the two clamping plates 6, with pivoting ball 5 therebetween, moving horizontally between the clamping ring 7 and the bottom 18.

The movement of pivoting ball 5, which is based upon the movement of guide rod 1 in valve guide 2 results in the shape of the valve guide 2 being transmitted, by means of follower levers 8, to the ends of centering levers 22 which pivot around points 21. Each follower lever 8 is provided with two facing stops, 8a and 8b, which are mounted to lower clamping plate 6, bearing in a sliding manner against the pivoting ball 5, and each follower lever 8 can be displaced, as lower clamping plate 6 is displaced, in radial translation with respect to the pivoting ball 5. Alternatively, the follower levers 8, with stops 8a, 8b, may be formed as a one piece structure with lower clamping plate 6.

Figure 7A:
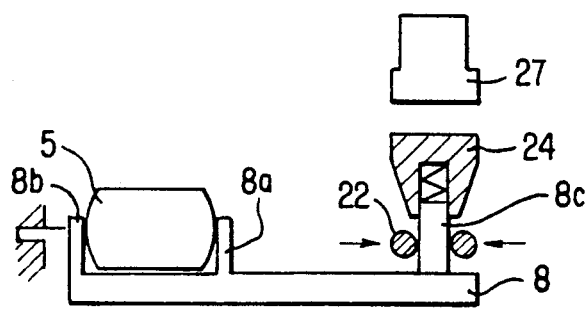
FIGS. 7a-7d show schematically the fine centering of the guide rod.
Figure 7B:
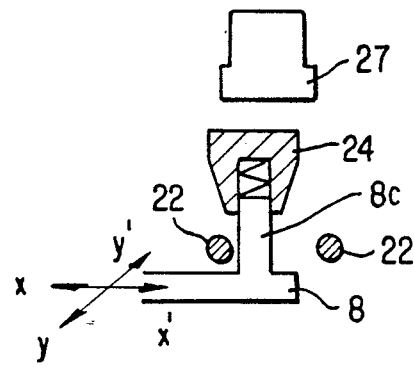
Figure 7C:
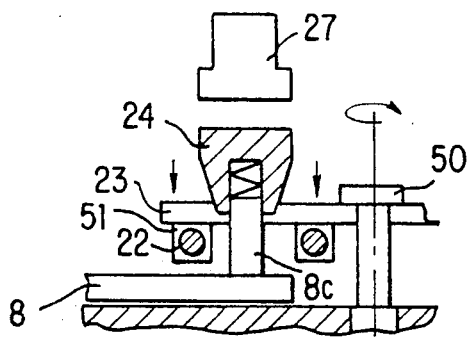
Figure 9:
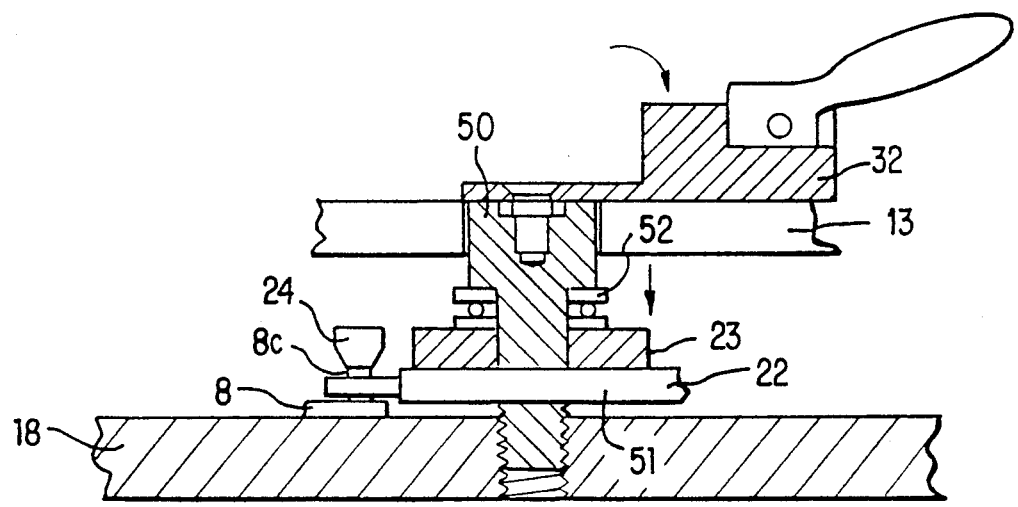
FIG. 9 shows in partial cross section, as viewed from line 9—9 of FIG. 4, locking the centering levers in place.

During the period that the pivoting ball 5 is being displaced, the centering levers 22 may be moved. The centering levers 22 have a portion 51, that has a flat upper surface, and a cylindrical end portion having a round cross section. Thus, the ends, having the cylindrical shape, of each pair of centering levers 22 (FIG. 4 and FIGS. 7a-7c) may be separated, as pivoting ball 5 reflects the nutation pattern of the guide rod, by the pivoting of centering levers 22 around points 21. A point proximate the interface between the lower portion of centering cones 24 and shafts 8c contacts the ends of centering levers 22 to cause their movement. When the nutation pattern has been completed, that is the guide rod has transmitted a path around the inner surface of valve guide 2, a clamp 32, mounted to an upper surface of pivoting arm 13 (the upper surface being cut away in FIG. 3 and shown in FIG. 5), is rotated one-quarter of a turn so that the centering levers 22 are fixed in the centering positions by means of a clamping bridge 23 engaging portions 51 (FIGS. 7c and 9).

Clamp 32 is pivotally mounted to the upper surface of pivoting arm 13 by attachment to jack block 50. Jack block 50 is threadably received in bottom 18 of pivoting arm 13 after passing through an opening in clamping bridge 23. Rotation of clamp 32 rotates block jack 50 to either raise or lower the block jack 50, by its threadable engagement with bottom 18, to either disengage or engage clamping bridge 23 from portions 51 of centering levers 22. A bearing 52 is provided between jack block 50 and clamping bridge 23 to maintain the connection therebetween while permitting rotation of jack block 50.

After the one-quarter rotation to fix the centering levers 22 in position, clamp 32 is actuated to engage centering spring 28 to lower the centering cones 24, on shafts 8c of the follower levers 8, between the fixed centering levers 22 so that the pivoting ball 5 is placed in the center of the identified shape of the valve guide 2. By means of clamping levers 29 (one shown, a second clamping lever 29 being positioned on the opposite side of adaptor 20), it is now possible to lock the pivoting ball 5 in a fixed manner in the centered pivoting or translation position.

In order to machine the valve seat, the spindle 15 is rotated by means of an adapter 20. Mechanical, pneumatic, hydraulic or electrical devices can be used for this purpose.

Figure 4:
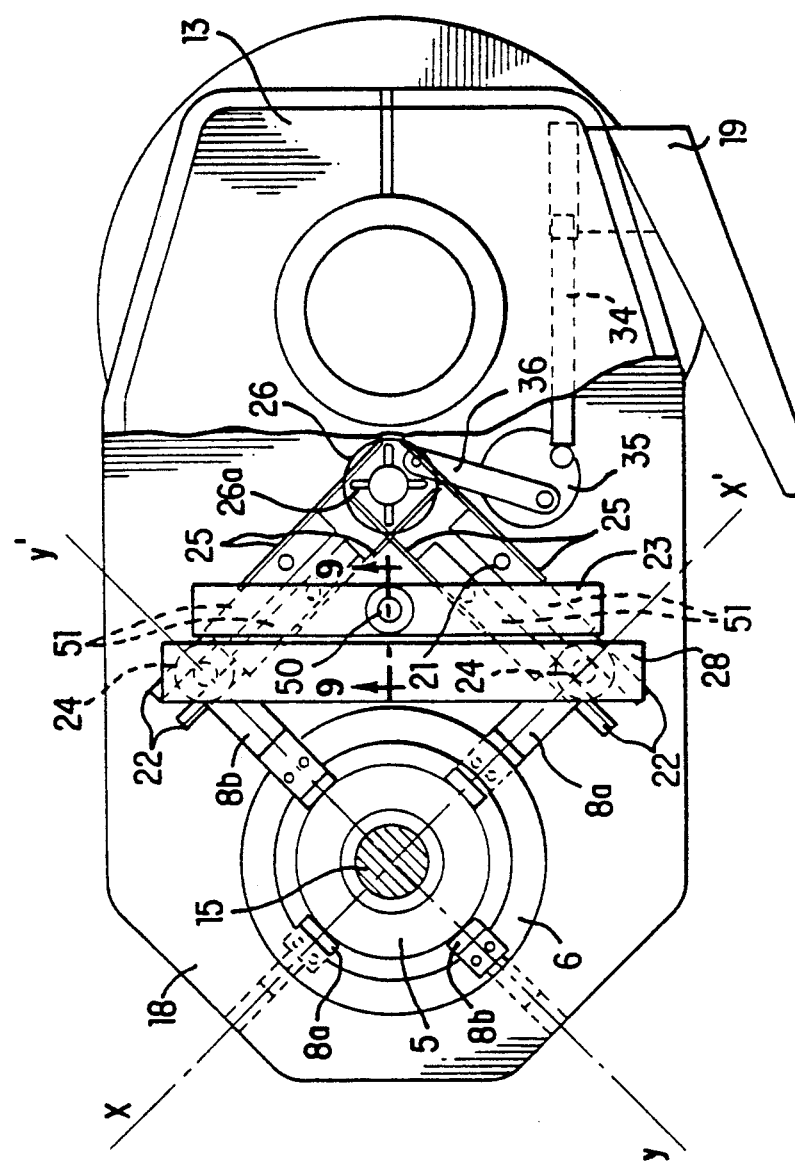
FIG. 4 is a view of the centering device in horizontal projection.

FIG. 4 is a larger scale view of the centering mechanism in horizontal projection. The lower clamping plate 6 rests on the bottom 18 of the housing. The pivoting ball 5, in which is mounted the spindle 15, is disposed on the lower clamping plate 6. During movement of the pivoting ball 5, the two follower levers 8 transmit the shape of the valve guide 2 to the two pairs of centering levers 22. The centering levers 22, each provided with a leaf spring 25 attached to portions 51, are mounted to pivot about points 21. Cam 26, by means of cam surfaces 26a, either locks the paired centering levers 22 into a final inside position or frees them for pivotal movement around points 21. Clamp 32, when released, can be rotated one-quarter turn so as to release clamping bridge 23. Thus, centering spring 28 can be freed so that cones 24 do not engage centering levers 22 and the clamping bridge 23 can be disengaged from portions 51 freeing centering levers 22 for movement.

Initially, clamping lever 19 is rotated to unlock pivoting arm 13 from support tube 10. The rotation of clamping lever 19 through linkage 33 causes cam 26 to rotate. At this time clamp 32 is released and rotated so that centering levers 22 may move freely.

Linkage 33 consists of a rod 34 pivotally mounted at one end to clamping lever 19 and at the other end to a rotatable plate 35. Also pivotally attached at one end to an adjacent quadrant of the rotatable plate 35 is an arm 36. The other end of arm 36 is pivotally mounted to cam 26. Thus, as shown in FIG. 4, when clamping lever 19 is rotated in a clockwise, or unlocking, direction, rotatable plate 35 rotates in a counterclockwise direction causing cam 26 to rotate in a clockwise direction and bring cam surfaces 26a into contact with leaf springs 25. The rotation of cam 26 causes cam surfaces 26a to engage leaf springs 25 which forces each pair of centering levers 22 into essentially a parallel relationship. In so doing, shafts 8c of the follower levers 8 cause the pivoting ball 5 and the guide rod 1 to be moved to a rough center position. Rough center is done prior to inserting guide rod 1 into valve guide 2.

After rough center the apparatus is repositioned, as will be discussed later, and the guide rod 1 inserted into valve guide 2. In this position, clamping lever 19 is rotated in the counterclockwise, or locking, direction so that, by means of linkage 33, cam 26 is rotated so as to disengage cam surfaces 26a from leaf springs 25. At this time the centering levers 22 are capable of pivotal movement around points 21. Centering is then carried out by means of the adaptor 20 so as to cause guide rod 1 to move on a path around the inner circumference of valve guide 2. The movement of guide rod 1 is transmitted to pivoting ball 5 and thence transmitted via the shafts 8c of the follower levers 8 to the centering levers 22 so as to cause each pair of centering levers 22 to be separated by a distance corresponding to a pair of axes (X—X' and Y—Y' of FIG. 4) defining the width and length of the rectangle or rhomboid such as shown in FIGS. 2e and 2f. Clamp 32 is then rotated one-quarter turn thereby lowering block jack 50 to press clamping bridge 23 on the upper surfaces of portions 51 thereby fixing the centering levers 22 in position. At that time, clamp 32 is actuated to engage centering spring 28 so that the two centering cones 24 are pushed, by the intermediary of the centering spring 28 and jacks 27, onto the locked centering levers 22 such that the follower levers 8 displace the pivoting ball 5 to the correct position centered in valve guide 2.

Figure 5:
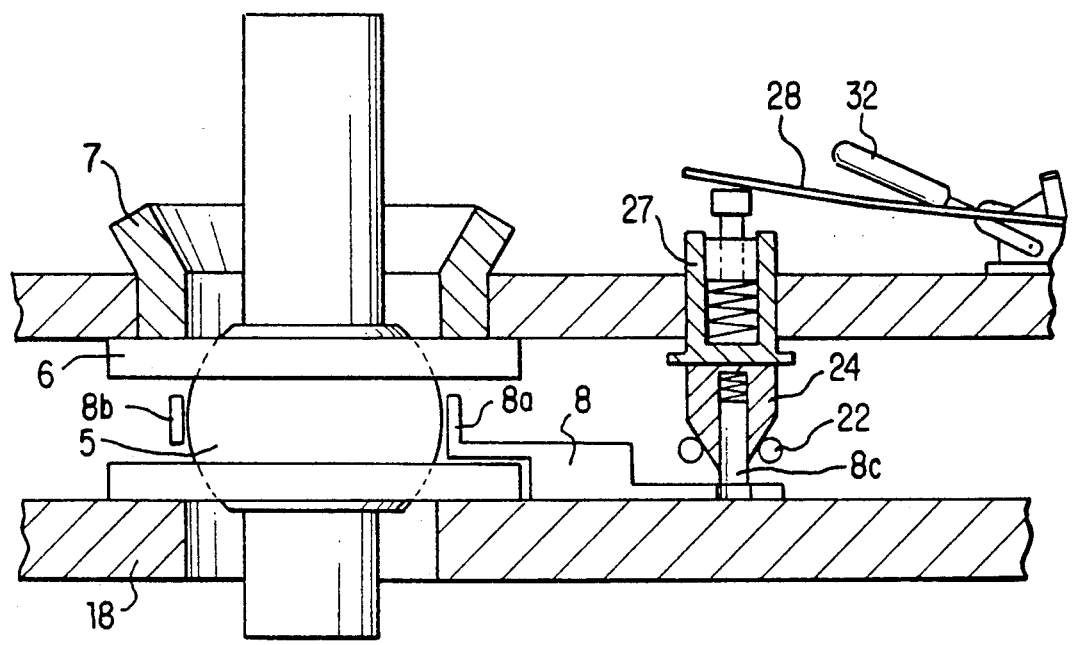
FIG. 5 is a view of the centering device in side projection.

FIG. 5 is a cross-sectional view of the centering components. In particular it is possible to see in this Figure the function of the centering cones 24, which displace or are displaced by the pivoting ball 5 by the intermediary of the follower levers 8. The centering cones 24 are actuated by the intermediary of jacks 27, which are provided with built-in assemblies of springs which are themselves actuated by the intermediary of the centering spring 28. When the clamp 32 is released, removing the pressure from centering spring 28, the built-in spring assemblies force the centering cones 24 and jacks 27 upwardly on shafts 8c.

The centering cones 24 are separate from jacks 27 so that the centering cones are capable of limited lateral movement with respect to the jacks 27. The upper surface of centering cones 24 contacts the lower surface of jacks 27 in a slidable manner. This permits the conical portion of the centering cones to ride along the centering levers 22 when clamp 32 is actuated to apply pressure to centering spring 28, which in turn forces both jacks 27 and centering cones 24 downwardly, the centering cones 24 moving downwardly on shafts 8c.

Figure 6:
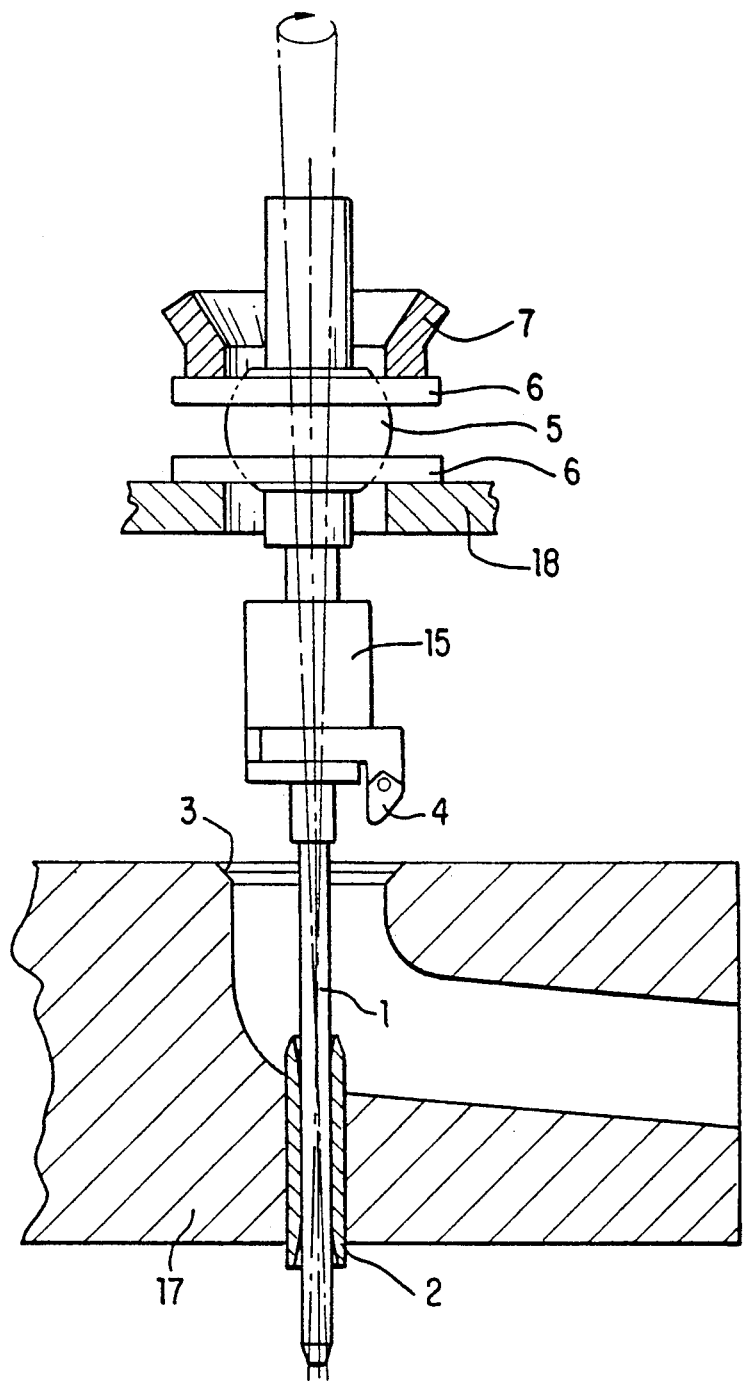
FIG. 6 is a diagrammatic representation of the spindle, provided with the shaping tool, which is mounted in a pivoting ball, and of the guide rod inserted in a valve guide.

FIG. 6 shows in a diagrammatic manner how guide rod 1 inserted in the valve guide 2 exhibits play in the latter. This play arises on the one hand because the fitting precision of the guide rod 1 is always flawed by an error, but also because the valve guide 2 is worn. The play which is shown has, of course, greatly exaggerated dimensions in order to make the problem solved by the invention clearer. By means of the centering device, it is now possible to place the guide rod in a central position within the play of the rod 1, a play which, with a device according to the invention, is intentionally chosen as being not too restricted. In this way, a placing in an average position is thus carried out with respect to a possible error in the position of the plane of rotation described by the shaping tool 4 which carries out the machining. With the described device, the machining method according to the invention proceeds as follows.

After fixing the cylinder head 17, provided with valve seats 3 to be machined, in such a way that the seats 3 are facing upwards, the fixing plate 12 is positioned and it is clamped on the cylinder head 17. The device is now placed by the base flange 9 on the fixing plate 12 with the guide rod 1 protruding, outside of the valve guide 2, in a downward direction into free space.

After having fixed the base flange 9 by means of the grip 11, there is carried out, in a first step a) of the method, a rough centering of the guide rod 1. The pivoting ball 5 is unclamped, by releasing both clamping levers 29, so as to be pivotal between clamping plates 6 while being movable or slidable with clamping plates 6 over bottom 18. At that time clamp 32 is released to release centering spring 28 thereby allowing jacks 24 to move upwardly on shafts 8c. Clamping lever 32 is then rotated one-quarter turn so that clamping bridge 23 is disengaged from portions 51 of centering levers 22 by means of the threadable engagement of the jack block 50 in bottom 18 raising the jack block 50. The clamping lever 19 is then rotated to release pivoting arm 13 from support tube 10. With the release of the clamping lever 19, the cam 26 is actuated through linkage 33 so that the contact of cam surfaces 26a with leaf springs 25, fixed to the centering levers 22, through the shafts 8c of the follower levers 8, brings the pivoting ball 5 into the central position. In so doing, the centering levers 22 pivot around points 21, as a result of the contact between cam surfaces 26a and leaf springs 25, and are brought to a substantially parallel position which centers the pivoting ball 5 (see FIG. 7a). The pivoting ball 5 is now in the middle of its translation range. This guarantees that the subsequently established play of the guide rod 1 in the valve guide 2 can be identified by the guide rod 1, along the edge of the corresponding shape of the valve guide 2, and therefore that this play can be measured in all directions. During this rough centering the pivoting arm 13 is held in position on support tube 10 by height adjusting screw 14 contacting base flange 9.

For step b), the base flange 9 is unclamped from the fixing plate 12 by means of the grip 11 and the device is raised. The fixing stud is then displaced in translation in the dovetail guide 31 of the fixing plate 12, in the direction of the valve seat to be machined. Then, the guide rod 1 is inserted in the valve guide 2, at a height such that the shaping tool 4 almost touches the valve seat, and the base flange 9 is simultaneously placed on the fixing stud. By means of the grip 11, the base flange 9 is fixed in a fixed manner onto the fixing plate 12.

In step c), the fine centering of the guide rod 1 in the valve guide 2 is carried out. For this purpose, by means of the clamping lever 19, the pivoting arm 13 is locked on the support tube 10 at the height at which the shaping tool 4 almost touches the valve seat. Simultaneously, the clamping lever 19, through linkage 33, releases the centering levers 22 by rotationally disengaging the cam surfaces 26a of the cam 26 from contact with leaf springs 25. Since the centering levers 22 are now free to pivot around points 21, by means of a substantially circular movement of the pivoting ball 5, achieved by applying a uniform horizontal pressure in all directions to adaptor 20 by hand or by means of a mechanical, pneumatic, hydraulic or electro-mechanical device, the shape of the valve guide 2 is identified with the guide rod 1. This nutation movement is transmitted, by the intermediary of the follower levers 8, one for the distance between the length sides of the rectangle or rhomboid according to FIGS. 2e or 2f and the other for the distance between the width sides of the same rectangle or rhomboid (axes X—X' and Y—Y' of FIG. 4), to the centering levers 22 which have been released and may pivot around points 21. The final position of each of the centering levers 22 corresponds to an extreme position of the total translation of the follower levers 8 as a result of the play of the guide rod 1 in the valve guide 2. Thus, each pair of centering levers 22 defines a one of the distances of the length or the width of the rectangle or rhomboid. At this time, because the centering cones 24 are elevated due to the release of pressure on centering spring 28, there is gap between at least one side of the centering cone 24 and the facing centering lever 22 (See FIG. 7b).

Figure 7D:
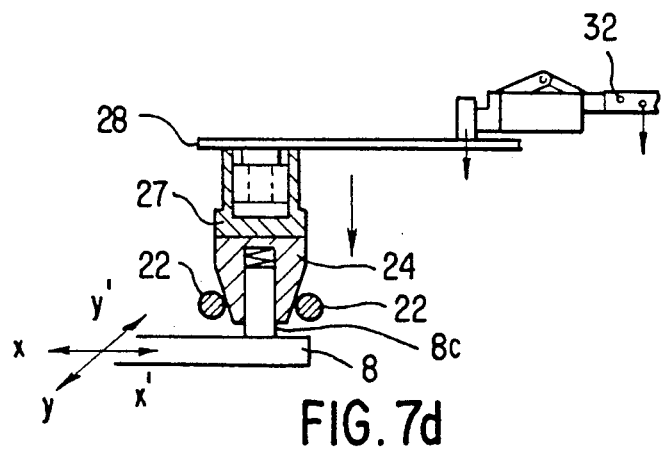
Figure 8:
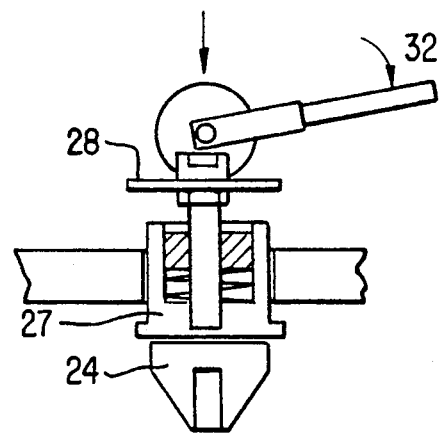
FIG. 8 shows a side view, in partial cross section, of the clamping lever engaging the centering spring.

At the completion of nutation, clamp 32 is rotated one-quarter turn so as to engage clamping bridge 23 against portions 51 of centering levers 22, by means of the threadable engagement between jack block 50 and bottom 18, thereby locking the centering levers 22 in position (see FIGS. 7c and 9). Clamp 32 is then actuated to apply a pressure to centering spring 28. Centering spring 28 therefore provides a downward pressure on jacks 27 which engage and push centering cones 24 downwardly on shafts 8c (see FIG. 7d). The downward movement of the jacks 27 forces the downward displacement of the centering cones 24. By the downward displacement of the conical surfaces of the centering cones 24, the centering cones 24 are centered between the locked centering levers 22, which then place, by the intermediary of the follower levers 8, the pivoting ball 5 and, therefore also, the guide rod 1 exactly in the central axis of the valve guide 2.

In step d), the clamping levers 29 are actuated, which fixes the pivoting ball 5 in a rigid manner, by the applying a downward locking force on the clamping ring 7 and the clamping plates 6. It is now possible to carry out the machining of the valve seat 3, by means of the spindle 15 provided with the shaping tool 4, and by means of the forward feed nut 30.

The method according to the invention allows the centering of a guide rod 1 with precision in a valve guide 2. The centerings are reproducible and they are carried out with a precision which could not be achieved with the known devices. The invention allows the centering of guide rods and the machining of valve guides with extreme precision.

What is claimed is:

1. A method for centering a guide rod in a valve guide, for the purpose of precision machining of a valve seat, comprising the steps of:
   nutation of the guide rod around an inner surface of the periphery of the valve guide;
   determining in at least one centering plane a closed line of nutation inscribed in a rectangle or rhomboid; and
   centering the guide rod in said centering plane at the center of said rectangle or rhomboid.

2. The method as claimed in claim 1, wherein the minimum dimensions of the rectangle or rhomboid are determined by a pivoting ball, in which is mounted a spindle provided with the guide rod, that is held in a rotary and pivoting manner in all directions and, during the nutation of the guide rod, displaces at least two follower levers from a zero position, each follower lever is provided with two stops applied facing each other against the pivoting ball, one of the follower levers for determining the distance between the length sides of the rectangle or rhomboid, and a second follower lever for determining the distance between the width sides of the rectangle or rhomboid, each follower lever displacing two centering levers to a final position such that their separation corresponds to the total translation of the follower levers resulting from the play of the guide rod in the valve guide and the step of then locking the centering levers in their final position.

3. The method as claimed in claim 2, wherein the centering of the guide rod is accomplished by a respective centering cone, mounted on the follower lever, being lowered between the centering levers which are locked in their final position, such that the cone is centered between the centering levers thereby displacing the follower lever, which is connected to the centering cone, to a centered position.

4. The method as claimed in claim 3, being implemented with a machining device which, for the purpose of guiding the shaping tool, has a spindle with a guide rod for insertion in the valve guide to be machined extending therefrom, the spindle being mounted, by means of a pivoting ball, in a support on a pivoting arm which is itself mounted with the possibility of pivoting in all directions and of locking on the arm, and the arm being mounted with the possibility of height adjustment on a support tube, wherein:
   a) the spindle provided with the guide rod, unclamped in the support, is able, outside the valve guide and when the base flange is placed on the fixing plate, to be displaced by means of a mechanical preliminary centering device, to the middle of the translation range which can be obtained on the device, in order to guarantee that a play subsequently established by the guide rode in the valve guide can be identified by the guide rod along the edge of the corresponding shape of the valve guide, and therefore the play can be measured in all directions;
b) the guide rod is inserted in the valve guide of the valve seat to be machined, the pivoting arm is adjusted on the support tube at a height at which the shaping tool almost touches the valve seat and the pivoting arm is locked on the support tube;
c) the guide rod of the device is finely centered by carrying out a circular movement of the pivoting ball, such that a nutation of the said guide rod is obtained inside its play in the valve guide, with the application of a pressure which is practically uniform in all horizontal directions, such that the shape of the valve guide is determined and after which the guide rod is placed in the central axis of the valve guide;
d) the spindle provided with the guide rod is locked in a fixed manner in the pivoting arm, after which the spindle, to which is fixed the shaping tool, is advanced and caused to rotate for the purpose of precision machining of the valve guide.

5. A device for establishing true center for precision machining of a valve seat and guiding a shaping tool, comprising;
   a spindle mounting a guide rod to be inserted in a valve guide of a valve seat to be machined, the spindle being mounted, by means of a pivoting ball, in a support capable of pivoting in all directions and of being locked in position with respect to said support;
   means for determining the distances between the length sides and width sides of a rectangle or rhomboid which surrounds a nutation pattern of the guide rod around the inner surface of the valve guide; and
   means for placing the guide rod at the center of the rectangle or rhomboid thus determined.

6. The device as claimed in claim 5, wherein the means for determining the distance of the length sides and of the width sides of the rectangle or rhomboid comprises at least two follower levers, each of the at least two follower levers being provided with two stops opposite one another with the pivoting ball therebetween, the follower levers being displaceable in translation substantially radially with respect to the pivoting ball; a pair of centering levers associated with each follower lever, the follower lever displacing the two centering levers such that the centering levers, during the radial translation of the follower levers, can be separated from each other against the action of a return force and according to the value of the play of the guide rod; and means for fixing the centering levers in their final position.

7. The device as claimed in claim 6, wherein the means for placing the guide rod at the center of the determined rectangle or rhomboid comprises, for each pair of centering levers:
   a centering cone which is connected to the associated follower lever such that the centering cone, during its lowering between the centering levers which are separated and fixed in position, finds a center position between the centering levers and moves the follower lever into a corresponding center position.

8. The device as claimed in claim 6, wherein the means for fixing the centering levers in position comprises at least one clamping bridge which applies pressure to the centering levers and thus locks them in position.

9. The device as claimed in claim 6, further comprises a preliminary centering device comprising a cam shaft having cams mounted thereon such that by rotation of the cam shaft, the cams act upon leaf springs which are connected to the centering levers so that the centering levers are applied against the centering cone.

10. The device as claimed in claim 5, wherein a one of mechanical, pneumatic, hydraulic and electro-mechanical means are provided for the nutation of the guide rod around the inner surface of the valve guide.

* * * * *